SENSITIVE RELAY OPERATING CIRCUIT

Filed Jan. 24, 1963 2 Sheets-Sheet 1

INVENTORS
W.R. SMITH AND
K.H. FRIELINGHAUS
BY
Forest B. Hitchcock
THEIR ATTORNEY

*INVENTORS*
W. R. SMITH AND
K. H. FRIELINGHAUS
*BY* [signature]
THEIR ATTORNEY

3,231,788
SENSITIVE RELAY OPERATING CIRCUIT

Willis R. Smith and Klaus H. Frielinghaus, Rochester, N.Y., assignors to General Signal Corporation, Rochester, N.Y., a corporation of New York Filed Jan. 24, 1963, Ser. No. 253,611
6 Claims. (Cl. 317—151)

This invention relates to relay operating circuits, and more particularly to a circuit for operating a direct current relay from a weak radio frequency signal source.

Recent advances in high-speed solid state magnetic switching devices have encouraged widespread use of radio frequency switching circuits in conjunction therewith. However, present state-of-the-art magnetic devices permit only relatively weak signals to be switched by these devices, since the radio frequency signals used for operating the devices must themselves be low amplitude signals. These signals are of too low an amplitude to operate direct current relays, other than specially designed, highly-sensitive relays. The present invention is designed to permit operation of conventional direct current relays from weak radio frequency signals, without need of any intervening active circuit elements. This is especially useful where fail-safety is an essential circuit requirement, such as with railroad track circuits.

In accordance with the foregoing, it is one object of this invention to provide a circuit using only passive circuit elements to actuate a conventional direct current relay from a weak radio frequency signal source.

Another object of this invention is to provide a circuit for increasing the amplitude of radio frequency voltage applied to a direct current relay from a radio frequency signal source up to double the maximum amplitude of source voltage.

Another object is to provide a circuit for operating a direct current relay from a weak alternating current signal source through a unidirectional conducting device having inherent undesirable turn-off characteristics whereby current continuously flows through the unidirectional conducting device in a forward direction so as to avoid encountering the undesirable turn-off characteristics in circuit operation.

Another object is to provide a circuit for operating a direct current relay from a weak radio frequency signal source whereby current through the relay coil always flows through a closed circuit maintained by a shunting diode, thereby avoiding creation of inductive voltages across the relay coil.

The invention contemplates a circuit for controlling current to a load in accordance with existence of a weak radio frequency signal comprising a relay having its contacts controlling an independent signal applied to a load, the relay coil being directly energized from the source of radio frequency energy in series with an energy storage device, and a unidirectional conducting device connected in parallel with the relay coil whereby voltage stored on the energy storage device is added to the voltage produced by the radio frequency source to produce a voltage across the relay having an amplitude substantially greater than that of the radio frequency signal itself.

The foregoing and other objects and advantages of the invention will become apparent from the following detailed description when read in conjunction with the accompanying drawings, in which.

Figure 4:
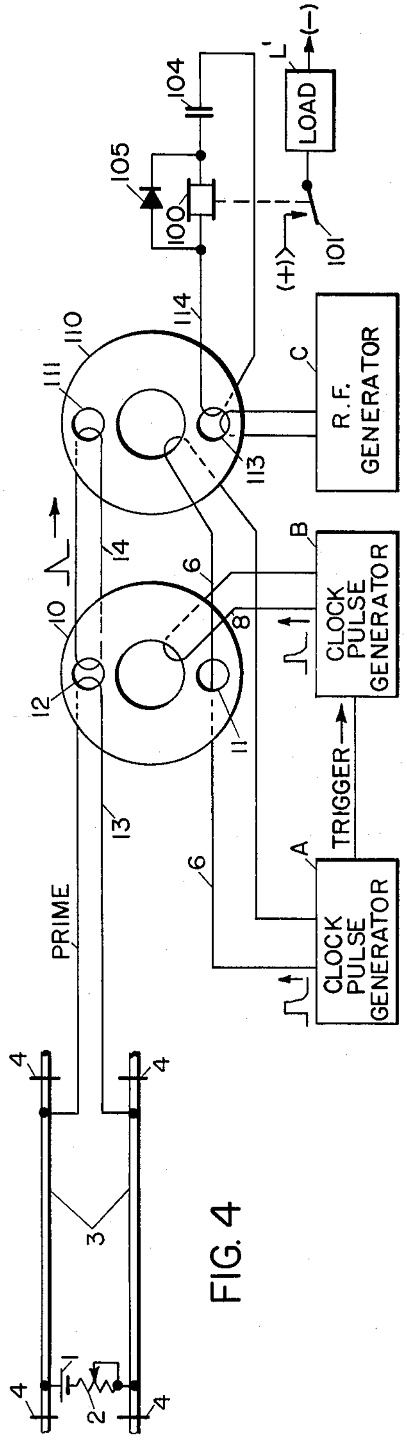

FIG. 4 is a schematic diagram of a track circuit similar to that disclosed in the pending application of R. C. Buck, Ser. No. 221,983, filed September 7, 1962, employing the present invention for operating a relay from the output of a multi-aperture ferrite core.

Figure 5:
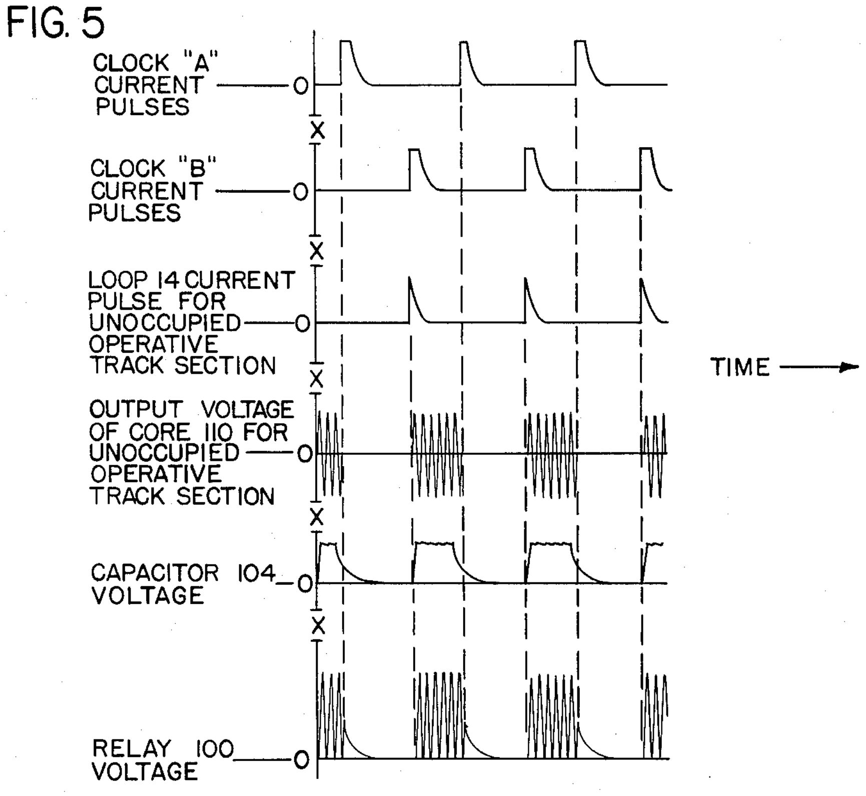
Figure 3:
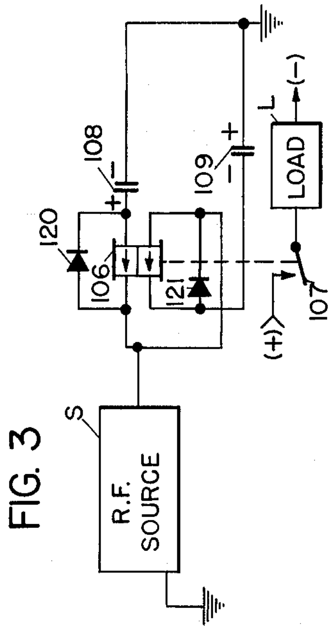
FIG. 3 is a schematic diagram of a second embodiment of the present invention.

FIG. 5 is a graphical illustration of pulse sequences occurring in the circuit of FIG. 3.

Figure 1:
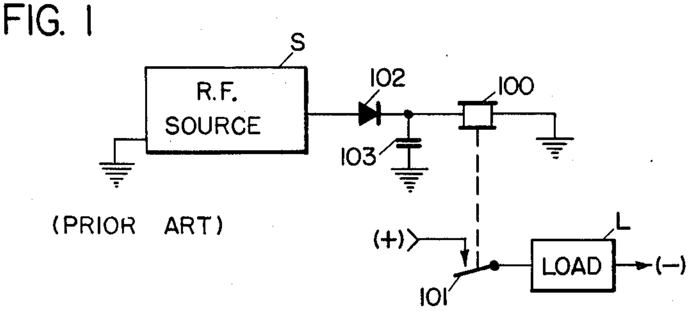
FIG. 1 is a schematic diagram of a prior art circuit for energizing a relay from a radio frequency source.

Turning first to the prior art circuit of FIG. 1, a direct current relay 100 having a front contact 101 is shown with its operating coil connected to a source of alternating radio frequency energy S through a unidirectional conducting device, such as a diode 102. A capacitor 103 is connected in parallel with the coil of relay 100. A load L is connected to a source of direct current energy through front contact 101.

In operation, the circuit of FIG. 1 causes application of direct current energy to load L upon energization of relay 100, through closed front contact 101. Relay 100 is energized when the voltage stored on capacitor 103, which charges in a unilateral direction through diode 102, rises above the amplitude of voltage required to energize relay 100. On the other hand, when the voltage stored on capacitor 103 falls below the dropout value of relay 100, the relay deenergizes, opening front contact 101 and thereby deenergizing the load.

The prior art circuit of FIG. 1 has certain disadvantages. When the voltage amplitude of the radio frequency signal is very low, as is the case when the signal is taken from a multi-aperture ferrite core, the voltage drop across the diode is quite appreciable in relation to the radio frequency voltage amplitude, resulting in considerable loss of voltage through this element. Another problem occurs when the frequency of the radio frequency signal is quite high, and the voltage and current of the radio frequency signal are both very low in amplitude. In such instance, the diode is relatively slow to turn off when the voltage across the diode reverses polarity. This results in discharge of storage capacitor through the diode during a portion of the reversed polarity of the signal. In order to overcome both of the aforementioned disadvantages, the novel circuit of FIG. 2 has been developed.

Figure 2:
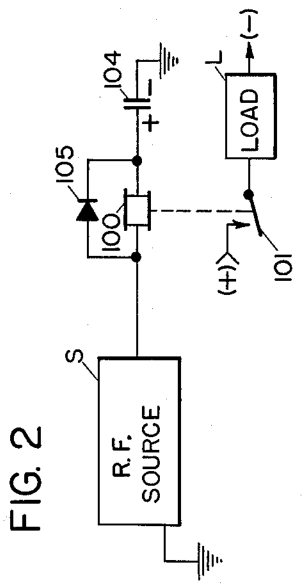
FIG. 2 is a schematic diagram of one embodiment of the present invention.

Turning now to FIG. 2, the relatively weak source of alternating radio frequency energy S is shown producing an output which is coupled to the operating coil of direct current relay 100. A unilateral conducting device, shown as a diode 105, is connected in parallel with the coil of relay 100. An energy storage device, such as a capacitor 104, is connected in series with the parallel combination of relay 100 and diode 105. Front contact 101 of relay 100 controls application of power to load L.

It should be noted that although the relay coil presents an inductive load to source S, it is not necessary to select a value for capacitor 104 of proper size to tune the circuit to series resonance, since the circuit will operate properly when it is not tuned. However, tuning the circuit to series resonance by making capacitive reactance equal to inductive reactance at the frequency of source S will effectively enable relay 100 to energize at a still lower value of radio frequency source power, even though the ratio of inductive reactance of the relay coil to the resistance of the relay coil, or in other words Q, is of a relatively low value, as is generally the case for relays.

In operation, assume a signal is produced from radio frequency source S. During the positive half cycle of the signal, substantially no current flows through the coil of relay 100, since the inductive reactance of the coil at radio frequencies is extremely high. However, current does flow in the forward direction through diode 105, causing capacitor 104 to charge with a voltage of polarity as indicated in the figure. Charging of the capacitor occurs almost instantaneously, since diode resistance in the forward current direction is very low. This causes the RC time constant of the charging circuit for capacitor 104 to be of etxremely low value.

When the polarity of the signal produced by radio frequency source S swings negative, capacitor 104 discharges through the coil of relay 100 which, although it presents a high impedance to the capacitor, is still of lower impedance than that of the diode in the reverse current direction. It should be noted that the voltage across the coil of relay 100 at the instant the radio frequency source voltage reaches its negative peak is substantially twice the instantaneous negative amplitude of the voltage produced from radio frequency source S, since the time constant of the capacitor discharge path is very high with respect to the period of the radio frequency signal. This coil voltage is of sufficient amplitude to energize relay 100, causing front contact 101 to close, energizing load L.

When the polarity of voltage produced from radio frequency source S next swings positive, capacitor 104 again charges. Additionally, since the coil of relay 100 is inductive, a voltage is induced across the relay coil causing a current to flow in the forward direction through diode 105. This induced current tends to retain relay 100 in the energized condition until the polarity of signal produced from radio frequency source S again swings negative. Thus, relay 100 remains in the picked-up condition.

It is obvious that throughout operation of this circuit, diode 105 conducts only in the forward direction. Thus, problems occurring in the prior art circuit of FIG. 1 are non-existent in the novel circuit of FIG. 2, since diode turn-off speed is of no consequence in the circuit of the instant invention. Furthermore, the alternating voltage produced across the coil of relay 100 is increased by a D.C. voltage level equal in amplitude to the maximum voltage amplitude of the radio frequency source. Moreover, voltage drop across the diode in the forward direction is of little consequence, since as capacitor 104 charges from source S, the voltage amplitude across capacitor 104 increases towards the positive voltage amplitude of source S. Thus, although current flow through the diode decreases to a low value, the diode current can continue to flow and charge the capacitor until the capacitor voltage becomes equal in amplitude to the maximum voltage amplitude of source S. The attendant diode drop therefore also decreases, to a value which reaches zero when the capacitor voltage amplitude becomes equal in amplitude to the maximum voltage amplitude of source S.

As an alternative, diode 105 can be connected across the coil of relay 100 in the reverse direction. If such is the case, voltage across capacitor 104 reverses polarity. Operation of the circuit is unaffected by such change.

Turning next to FIG. 3, there is shown a second embodiment of the invention whereby a relay having a split winding may be operated from a radio frequency source. In this embodiment, the upper winding of a relay 106 has a diode 120 connected in parallel therewith, and the parallel circuit comprising the upper winding of relay 106 and diode 120 is connected in series with a capacitor 108. Likewise, the lower winding of relay 106 has a diode 121 connected in parallel therewith, and a second capacitor 109 is connected in series with the parallel circuit comprising diode 121 and the lower winding of relay 106. For optimum circuit operation, diode 121 is connected from the source in a direction opposite to that of diode 120. Arrows on the relay indicate current flow direction through each half winding. The half windings are energized in an aiding direction. Front contact 107 of relay 106 controls application of power to load L.

In operation, when the voltage produced from radio frequency source S is positive, capacitor 108 charges with polarity as indicated in FIG. 3, through diode 120. When the voltage from source S swings negative, capacitor 109 charges through diode 121, with polarity as shown in FIG. 3. While capacitor 109 charges, capacitor 108 discharges through the upper winding of relay 106, tending to maintain a greater voltage amplitude on the upper winding of relay 106 than the maximum voltage amplitude produced from source S, in a manner similar to that explained in conjunction with FIG. 2. On the negative half cycle of the voltage from source S, capacitor 109 discharges through the lower winding of relay 106, tending to maintain a greater voltage amplitude across the lower winding of relay 106 than the maximum negative voltage amplitude produced from source S. Furthermore, when either capacitor 108 or 109 charges, the winding of relay 106 connected to the capacitor being charged discharges through the diode connected in parallel with the winding, in a manner similar to that explained in conjunction with FIG. 2. In this fashion, full-wave rectification of the signal from source S is achieved, and voltages of amplitude greater than the maximum produced from source S are applied across both windings of relay 106. Front contact 107 of relay 106 is thus maintained closed.

Turning next to FIG. 4, a schematic diagram of a track circuit similar to that disclosed in the aforementioned Buck application, Ser. No. 221,983 is shown utilizing the present invention. The track circuit comprises a suitable direct current source such as a battery 1 applying current to a track section 3 defined by insulators 4, through a limiting resistor 2. A first clock pulse generator A produces current pulses at an audio frequency rate over a conductor 6 wound through the minor aperture 11 of a first multi-aperture ferrite core 10 and the major aperture of a second multi-aperture ferrite core 110. These pulses comprise set pulses for core 10 and clear pulses for core 110.

A second clock pulse generator B produces current pulses over a winding 8 threading the major aperture of core 10. These pulses comprise clear pulses for core 10. Clock generator B may be triggered by clock generator A as shown in FIG. 4, in order to provide clock pulses at the same frequency or repetition rate as the clock A pulses, but at a different phase relation. However, any circuit for producing constant frequency pulses at different phase relation may be used in place of individual clock generators A and B.

A prime winding 13 receives direct current from track 3 and threads this current through a second minor aperture 12 of core 10. A loop 14 is wound through minor aperture 12 of core 10 and a minor aperture 111 of core 110 for coupling pulses from core 10 to core 110. A radio frequency signal generator C provides pulses on a winding threading a second minor aperture 112 in core 110. These pulses provide a prime and non-destructive readout drive pulses for core 110.

An output winding 114 threading minor aperture 112 has induced therein output radio frequency voltage pulses. These pulses are then applied to a circuit similar to that shown in FIG. 2, with the exception that load L′ must be periodically energized and deenergized to indicate a clear track; steady energization or deenergization of load L′ indicates occupancy of track 3 or a circuit failure. This feature therefore provides fail safety.

In operation, assume first that the track is unoccupied and electrically non-defective. Assume also that clocks A and B are producing pulses at identical frequencies and at a phase relation as illustrated graphically in FIG. 5. A steady direct current comprising a prime signal is coupled from battery 1 through track 3 to core 10 where it tends to prime minor aperture 12 of core 10. When a clock A pulse threads minor aperture 11 of core 10, it tends to set the core.

Immediately after occurrence of a set pulse through minor aperture 11 of core 10, minor aperture 12 becomes primed. Then, when a clock B or core 10 clear pulse is next applied, an output voltage is produced on loop 14, causing a current pulse to be coupled through minor aperture 111 of core 110.

The current pulses on loop 14 comprise set pulses for core 110. Clear pulses for core 110 are provided by winding 6. Flux reversal at a radio frequency rate around minor aperture 112 of core 110 is achieved by R.F. generator C when core 110 is set, thereby inducing a radio frequency voltage in winding 114. The waveform of this voltage, which comprises the core 110 output voltage, is illustrated in FIG. 5, in proper phase relationship with the current pulses produced by clocks A and B. The voltage produced on winding 114 corresponds to the weak radio frequency signal produced by source S in the circuit of FIG. 2. Therefore, operation of the circuit comprising relay 100, diode 105 and capacitor 104 is exactly as explained in conjunction with FIG. 2. Hence, relay 100 is periodically energized by bursts of radio frequency energy as long as prime current is applied through minor aperture 12 of core 10, clock pulses are produced by generators A and B, and a radio frequency signal is produced by R.F. generator C.

Because of the circuit configuration shown in FIG. 2, relay 100 remains steadily energized throughout the duration of each burst of radio frequency energy. These bursts of radio frequency energy are illustrated in FIG. 5 in proper phase relation with the voltage across the relay. The voltage on capacitor 104 is also illustrated in FIG. 5 and is seen to be a substantially constant voltage of amplitude equal to the maximum output voltage amplitude of core 110 during the intervals in which a radio frequency voltage appears on winding 114, dropping off only during the intervals in which no signal appears on the winding. The voltage across relay 100, which is the algebraic sum of the voltage across capacitor 104 and the voltage produced on winding 114, is graphically illustrated in FIG. 5.

Thus, there has been shown a circuit for enabling energization of a D.C. relay from a weak radio frequency source. An increased amount of current is permitted to flow through the relay due to application of a relay voltage greater in amplitude than the maximum amplitude of the source voltage, providing more efficient operation of the relay. Moreover, since relay coil current always encounters a closed circuit due to a shunting diode, there are no inductive voltages across the relay coil and current in the relay coil therefore continues to flow during the interval in which a capacitor is charged through the diode. Since current continuously flows through the diode in a forward direction, poor turn-off characteristics of the diode are not encountered. Furthermore, because only passive circuit elements are employed, the circuit is readily adaptable for use in fail-safe systems.

Although but several specific embodiments of the present invention have been described, it is to be expressly understood that these forms are selected to facilitate in disclosure of the invention rather than to limit the number of forms which it may assume; various modifications and adaptations may be applied to the specific form shown to meet requirements of practice without in any manner departing from the spirit or scope of the invention.

What is claimed is:

1. In a circuit for controlling energization of a relay having a split winding from a radio frequency energy source, the combination comprising a first diode connected in a first parallel circuit with one half of the winding, a second diode connected in a second parallel circuit with the other half of the winding, a first capacitor connected in series with the first parallel circuit and the source, and a second capacitor connected in series with the second parallel circuit and the source, whereby each half winding is energized from the capacitor connected directly thereto and from the source.

2. The circuit of claim 1 wherein the first diode is connected in the forward current direction and the second diode is connected in the reverse current direction.

3. In a circuit for controlling application of power to a load by energization of a relay from an alternating energy source, said relay having a split winding and an operable contact, the combination comprising first unidirectional conducting means connected in a first parallel circuit with one half of the winding, second unidirectional conducting means connected in a second parallel circuit with the other half of the winding, first energy storage means connected in series with the first parallel circuit and the source, second energy storage means connected in series with the second parallel circuit and the source, and a load connected in series with the contact, whereby each half winding is energized from the energy storage means connected directly thereto and from the source so as to actuate the contact and thereby affect energization of the load.

4. The circuit of claim 3 wherein said first and second unidirectional conducting means each comprises a diode and said first and second energy storage means each comprises a capacitor.

5. The circuit of claim 4 wherein the first diode is connected in the forward current direction and the second diode is connected in the reverse current direction.

6. The circuit of claim 4 wherein the value of each said capacitor is such to produce resonance at the source frequency with the half winding to which said capacitor is connected.

References Cited by the Examiner

UNITED STATES PATENTS

| | | | |
|---|---|---|---|
| 2,392,981 | 1/1946 | Fischler | 317—147 X |
| 2,635,197 | 4/1953 | Routledge et al. | 317—151 X |
| 2,876,396 | 3/1959 | Rush et al. | 317—141 |

OTHER REFERENCES

Basic Electronics, Navy Training Courses; United States Government Printing Office, Washington; 1955, pages 142–143.

SAMUEL BERNSTEIN, *Primary Examiner.*